June 24, 1958 R. GODBARSEN, JR 2,840,716
RAY SENSITIVE SCREEN UNIT AND ASSOCIATED APPARATUS
Filed July 7, 1953 4 Sheets-Sheet 1
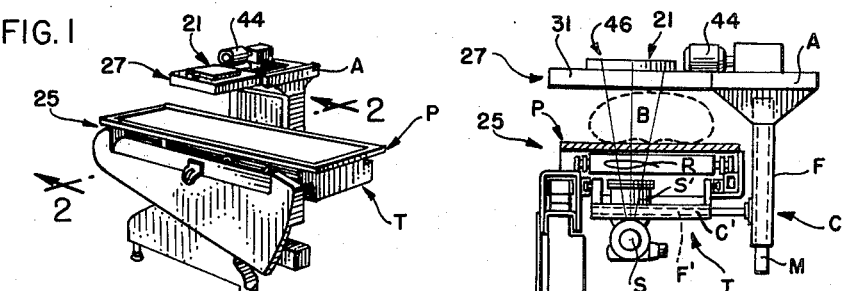
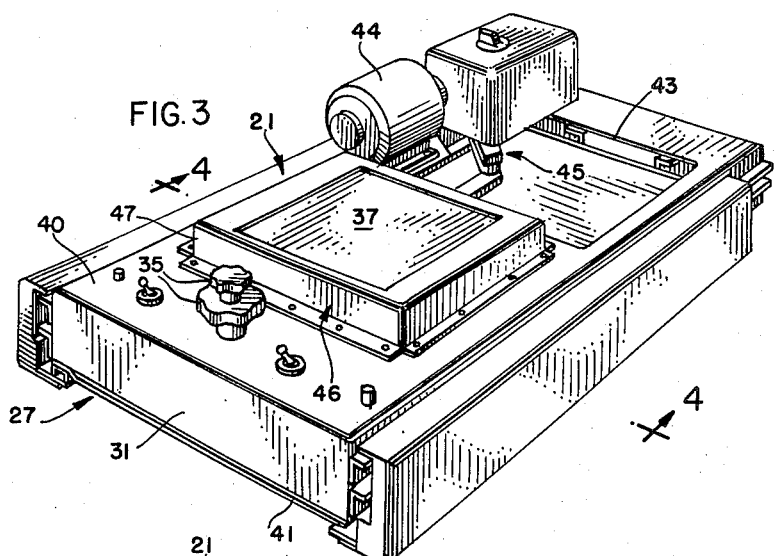
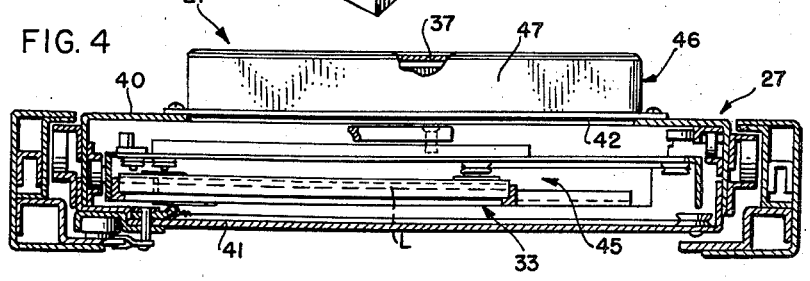
INVENTOR:-
ROBERT GODBARSEN JR.
BY:-
ATT'Y

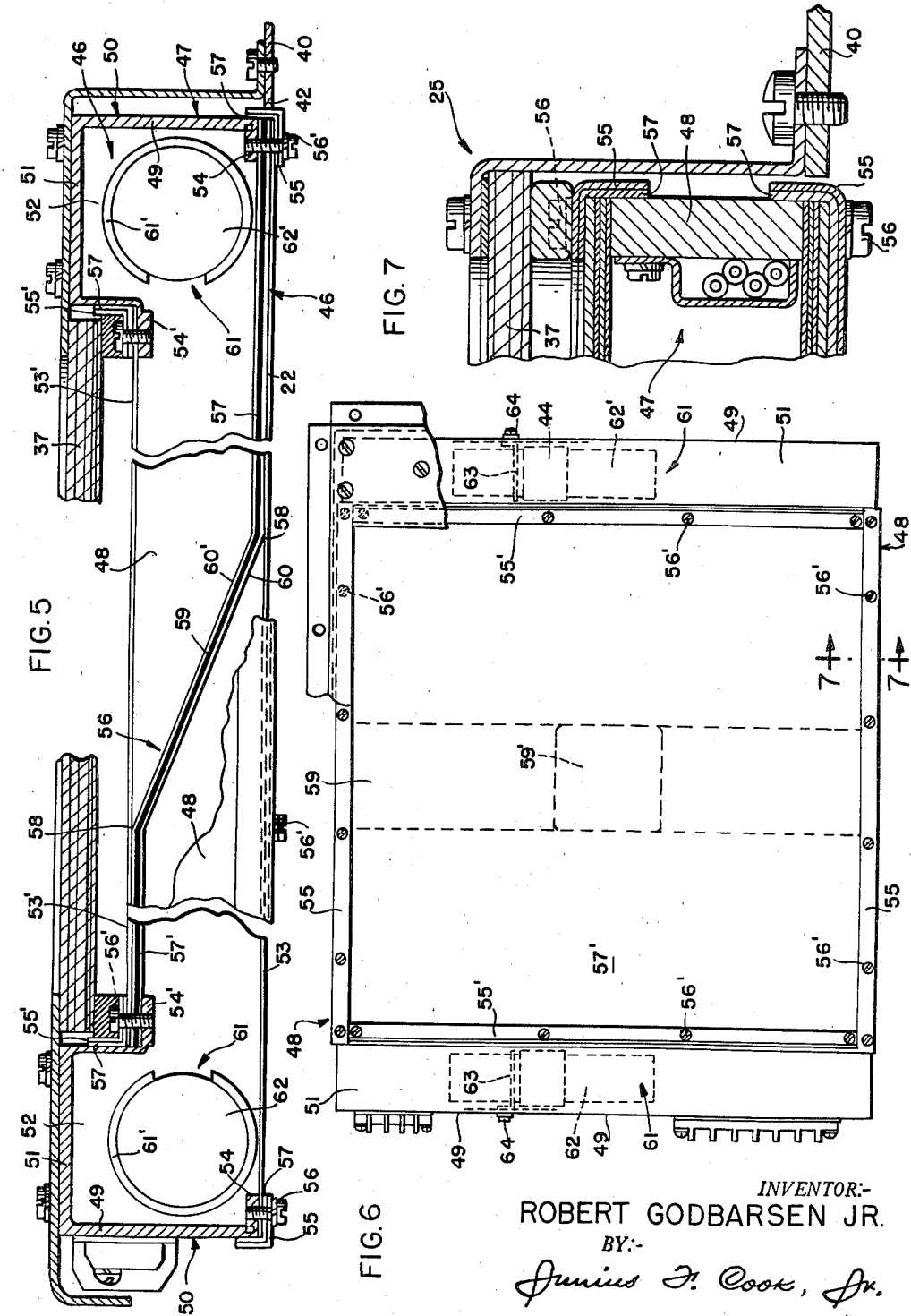

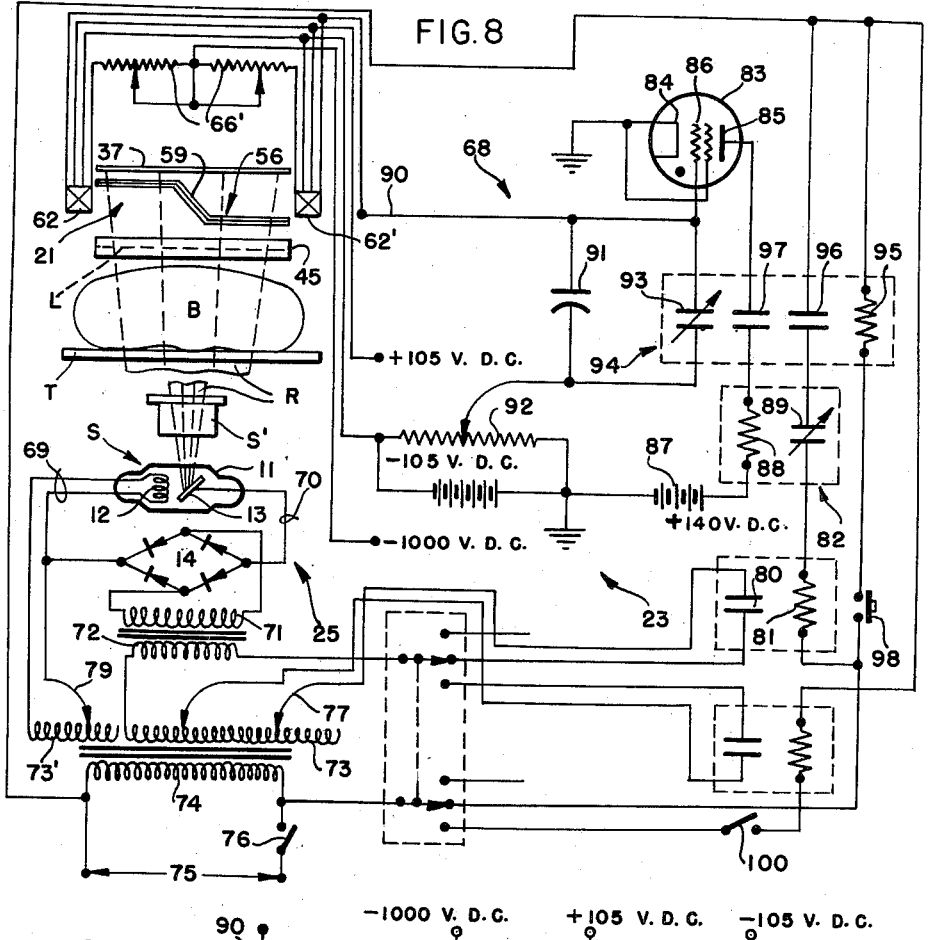
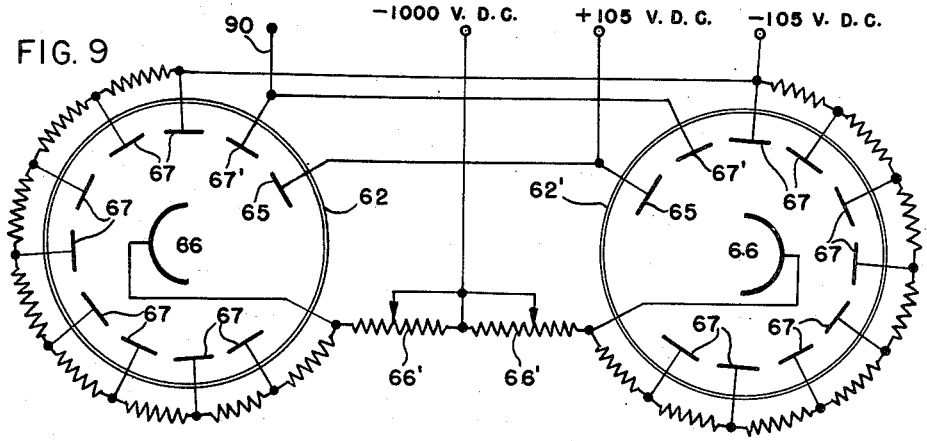

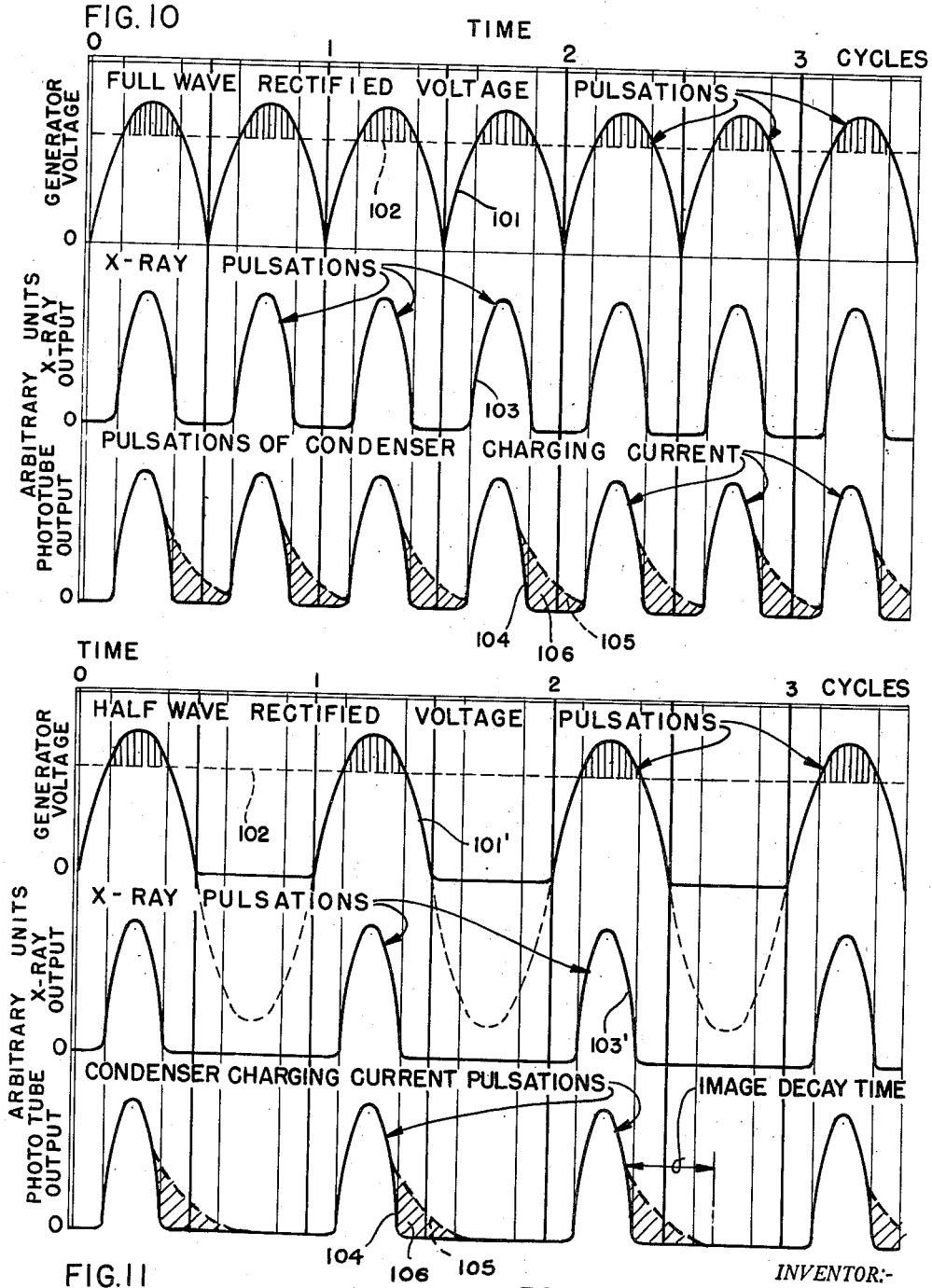

United States Patent Office 2,840,716
Patented June 24, 1958

2,840,716

RAY SENSITIVE SCREEN UNIT AND ASSOCIATED APPARATUS

Robert Godbarsen, Jr., Milwaukee, Wis., assignor to General Electric Company, a corporation of New York Application July 7, 1953, Serial No. 366,567

15 Claims. (Cl. 250—71)

The present invention relates in general to sensitive screen means for detecting penetrating rays, such as X-rays, and has more particular reference to screen means adapted, when exposed to the action of penetrating rays, to emit rays of characteristic wave length, in quantity substantially proportional to the quanta of penetrating rays impinging thereon, so that the screen means may be employed, in conjunction with a suitable light sensitive detector, for measuring the penetrating rays in terms of the response of the light sensitive detector.

X-ray photographs, commonly called radiographs, may be produced by causing rays, emitted from a suitable X-ray source, to traverse the object to be pictured and to impinge upon a layer of ray sensitive picturing material, during an appropriate exposure interval, to thus create in the picturing material a latent picture image. The so exposed sensitive material may then be treated chemically to develop the latent image as a visible picture therein. Ray sensitive material used in making radiographs is, usually, if not always, also sensitive to visible light. Accordingly, prior to exposure and development, ray sensitive material normally is enclosed in light-tight container or cassette means of ray pervious material, and, so enclosed, may be mounted in a cassette carrier in position to be exposed to X-rays.

Cassette carriers or holders may be of the sort adapted to receive a single cassette, containing sensitive material, and to support the same in position to be exposed. Cassette holders may also be provided, in conjunction with cassette changing apparatus, for presenting a plurality of cassettes, containing ray sensitive material, successively in position for X-ray exposure. Serialographic equipment also may be furnished for projecting a cassette, containing ray sensitive material, successively from a retracted to several relatively offset picturing positions, to thereby allow for the successive exposure of adjacent portions of the cassette enclosed sensitive material in making a series of related ray pictures therein.

Apparatus for timing the operation of penetrating ray equipment for the determination of ray exposure intervals in making radiographs, as well as when applying penetrating rays to other useful purposes, commonly comprises switch means controllingly connected with the ray emitting equipment, and operating means for causing such switch means to close and open, respectively, at the beginning and at the conclusion of the exposure interval, to thereby initiate and terminate the effective operation of the ray emitting equipment. Such operating means may comprise adjustable apparatus for measuring any selected elapsed time interval, within the range of the equipment, and means for starting the timing apparatus in operation coincidentally with the starting in operation of the ray emitting equipment, the timing apparatus being operatively associated with the controlling switch means of the ray emitting apparatus to stop ray emission therefrom precisely at the conclusion of the ray exposure interval.

As disclosed, for example, in United States Letters Patent No. 2,401,289 of May 28, 1946, covering the joint invention of Russell H. Morgan and Paul C. Hodges in X-Ray Exposure Timing Apparatus, it has been proposed to measure penetrating ray exposure intervals in terms of the aggregate quanta of rays delivered, by ray emitting apparatus, during an exposure interval, and to terminate the exposure interval as and when the measured ray quanta reaches a selected total value. To this end, rays delivered by the ray emitting equipment, during the exposure interval, may be applied to suitable material adapted to emit light rays of characteristic wave length in proportion to the quanta and intensity or quality of penetrating rays impinging thereon. The amount of radiation thus applied to the light sensitive material may be determined by measuring the light emitted from the sensitive material, as by means of a suitable detector that is sensitive to such emitted light; and suitable integrating means for measuring the aggregate quantity of light emitted by the sensitive material during an exposure interval may be provided in association with such detector means, in order to cause the performance of any desired operation, such, for example, as the disablement of the ray generating apparatus, after the same has been in operation during an interval of sufficient length to cause emission of a predetermined aggregate quanta of radiation.

An important object of the present invention is to provide screen means adapted to be disposed in the path of penetrating rays, such as X-rays, and to emit light rays of characteristic wave length in quantity proportional to the amount of radiation to which the screen may have been subjected; a further object being to provide, in conjunction with the screen, suitable detector means, sensitive to light rays of the sort produced by the screen when exposed to penetrating rays, such as X-rays, and adapted, in cooperation with suitable associated translation means, to control the operation of apparatus of any desired character, such as apparatus for disabling the operation of ray emitting equipment to thus terminate the exposure interval.

Another important object is to provide a ray monitor or detector comprising a screen adapted to be disposed in the path of penetrating rays, such as X-rays, and to emit light rays in opposite directions, transversely of the path of exciting rays, and light sensitive detector means disposed on opposite sides of the screen in position to be influenced by said oppositely projected light rays, whereby substantially all of the light emitted from both sides of the screen may be utilized in measuring ray quanta delivered upon the screen.

Another important object is to provide a ray responsive screen of the character described comprising a layer of ray sensitive material disposed at an inclination with respect to the path of impinging rays; a further object being to support the layer in a shallow housing adapted to be mounted in and transversely of the path of an exciting ray beam, including light sensitive detector tubes disposed in the housing on opposite sides of the inclined layer in position each to be illuminated by light rays emitted from a corresponding side of the inclined layer; a further object being to make the housing light tight in order that the photosensitive tube elements will respond only to rays emitted by the inclined layer under penetrating ray excitation.

Another important object is to make the inwardly facing surfaces of the housing light reflecting, as by coating the same with light reflecting material, such as white enamel.

Another important object is to provide a sensitive ray detecting screen unit comprising a generally flat, relatively shallow housing having opposite faces providing for uniform ray absorption throughout the entire area of said faces through which useful rays penetrate during the operation of the device; a further object being to extend the light sensitive layer throughout all portions of the housing penetrated by useful rays when the device is in use.

Another important object is to provide a screen unit of the character mentioned adapted to be interposed in the path of a useful ray beam traveling from a ray source to a station where such rays are usefully applied, wherein all portions of the unit which thus intercept the useful ray beam have uniform ray absorbing portions extending throughout the sectional area of the beam, whereby no part of the device may apply latent image characteristics in the useful beam as the same passes therethrough.

Another important object is to provide a ray detecting screen unit of the character mentioned adapted to be interposed, as a monitor or detector, in the path of a useful penetrating ray beam, between a ray source and a picturing panel adapted to receive a shadow image of an object interposed, in the ray beam, between the source and said picturing layer, the detecting screen unit and its enclosing housing having uniform ray absorptive characteristics throughout the area thereof penetrated by the beam in reaching the panel.

Another important object is to provide a screen unit of the character mentioned including a housing having a central portion forming an outwardly facing seat for supporting a ray sensitive picturing layer, such as a fluorescent screen adapted to receive therein visible shadow pictures of objects when excited by penetrating rays applied to the layer, through the object to be pictured, said housing having ray sensitive screen means therein extending entirely across the housing, at the portions thereof through which a ray beam necessarily penetrates, in reaching the picturing layer, said screen having an inclined central light emitting portion of projected area, in the direction of the ray beam, not greater than that of the minimum picturing ray beam that may be applied therethrough.

Another important object is to provide a screen unit of the character described that is particularly well suited for use in timing X-ray photographic exposures made in serialographic picturing apparatus of the sort disclosed, for example, in United States Letters Patent No. 2,327,603 of August 24, 1943, covering the invention of Arthur J. Kizaur in Radiographic Apparatus, and No. 2,552,858 of May 15, 1951, covering the joint invention of Robert J. Mueller and Ivan Burgeson in Serialographic Apparatus, and in an application for United States Letters Patent, Serial No. 343,094, filed March 18, 1953, covering the invention of Arthur J. Kizaur and Robert J. Mueller in Serialographic Apparatus.

The foregoing and numerous other important objects, advantages, and inherent functions of the invention will become apparent as the same is more fully understood from the following description, which, taken in conjunction with the accompanying drawings, discloses a preferred embodiment of the invention.

Referring to the drawings:

Fig. 1 is a perspective view of X-ray equipment of the sort with which ray detecting screen units embodying the present invention may be employed;

Fig. 2 is a sectional view taken substantially along line 2—2 in Fig. 1;

Fig. 3 is a perspective view of a portion of the equipment shown in Figs. 1 and 2;

Fig. 4 is a sectional view taken substantially along the line 4—4 in Fig. 3;

Fig. 5 is an enlarged view showing a portion of the structure illustrated in Fig. 4;

Fig. 6 is a top plan view of the screen unit;

Fig. 7 is a sectional view taken substantially along the line 7—7 in Fig. 6;

Fig. 8 is a diagrammatic showing of an electrical ray exposure interval timing system in which the screen unit may be connected for use;

Fig. 9 is a diagram showing a portion of the system illustrated in Fig. 8; and

Figs. 10 and 11 are graphs.

To illustrate the invention, the drawings show a ray sensitive detector unit 21 particularly adapted for placement in the path of penetrating rays, such as X-rays, to measure the amount or intensity thereof, and a translation system 23 actuated by said detector unit for controlling the operation of any equipment which it may be desired to control in accordance with measured characteristics of such rays.

As shown, the translation system 23 is of a sort adapted to measure total ray quanta, delivered during ray exposure intervals, and to operate apparatus for stopping the emission of the rays, after delivery of a selected or predetermined quanta thereof. More particularly, the unit 21 and system 23 are shown in conjunction with radiographic equipment 25, thus providing means for timing short exposure intervals by measuring ray quanta, delivered for picturing purposes, through an object to be pictured, and thence upon ray sensitive picturing material supported in the equipment 25, during an exposure interval, and for terminating the exposure interval when a selected ray quanta shall have been applied to the picturing material. Specifically, the illustrated unit is formed for use in cassette changing apparatus 27 of the sort shown in the aforesaid application for United States Letters Patent Serial No. 343,094, the same comprising mechanism for successively presenting cassette enclosed ray sensitive material in position for ray exposure at an exposure station in the equipment 25, in making radiographic pictures of an object B to be pictured.

It will be understood, however, that the present invention, in its broader aspects, is not necessarily limited to the employment of the ray sensitive detector unit in cassette shifting apparatus, nor to the timing of radiographic exposure intervals, nor indeed to the measurement of ray quanta, such environmental aspects being illustrated and described in order to demonstrate the invention and not by way of limitation.

Radiographic equipment, with which the detector unit of the present invention may be used, may comprise a table structure T providing a table top panel P for supporting an object or body B to be examined or radiographed, and carriage means C for supporting a suitable source S of penetrating rays, such as X-rays R, on one side of the panel P, said carriage means serving also to support a frame 31 carrying ray sensitive picturing means 33 on the side of the panel P remote from the source S, whereby a beam of penetrating rays R, directed from the ray source, through the panel and the examination object or body B supported thereon, may excite the sensitive picturing means 33 for the production of shadow pictures therein. As shown, the carriage means C may comprise a frame F disposed alongside of the table structure and having portions F' extending beneath the table top for supporting the ray source S thereunder, said frame portions being preferably carried on a subcarriage C' supported in the table structure for adjustment longitudinally of the top panel.

The frame portions F' may form a mounting for the ray source S which, as shown, may comprise an X-ray generating tube enclosed within a shockproof casing, said casing being secured on the frame portions F' in position such that X-rays, emitted by the tube when electrically energized for ray production, may be directed vertically toward and through the top panel P. The frame portions F' may also support a shutter box S' through which the rays are directed from the source S toward the top panel P. The shutter box S' is adjustable to control the sectional size and shape of the beam comprising the rays R. To this end the shutter box S' may comprise material, such as lead, substantially opaque to the penetrating rays R. The box may be formed with an open top fitted with suitable ray opaque shutters adapted adjustably to define an aperture through which rays emanating from the source S may pass. Preferably four shutters are employed for controlling the size and shape of the X-ray beam. Two of the shutters may be provided to mutually open and close in a direction longitudinally of the table structure, while the remaining two shutters may be arranged to open and close in a direction transversely of the table structure. The sectional shape of the beam controlled by such shutters is, of course, rectangular, and the shutters, furthermore, are preferably drivingly interconnected so as to define a beam of substantially square sectional shape. Operation of the shutters for controlling the sectional size of the beam may be accomplished by means of manually operable control handles or knobs 35, which may be mounted in convenient position for manipulation, as on the frame 31.

To support the frame 31 in position presenting the picturing means 33 in alinement with rays emitted from the source S, the frame F may extend upwardly of the top panel, at a side thereof, and may comprise a rectangular structure forming preferably roller trackways for supporting a mounting frame M for adjustable movement on the frame F in a direction at right angles with respect to the plane of the table top panel P. The mounting frame M may carry a pair of spaced apart support arms A extending above the top panel P for carrying the frame 31 on and in position extending between said support arms. The ray source S and the sensitive picturing means 33 may thus be adjusted to any position longitudinally of the panel P. The carriage means C is also adjustable laterally of the top panel P, by movement of the frame portions F' in the subcarriage C', to thereby adjust the ray source and the sensitive picturing means in a direction laterally of the panel P.

It will be obvious, of course, that the ray source and the sensitive picturing means may be mounted on separate, independently operable carriage structures, and that said source and sensitive means may be mounted on carriage structures supported otherwise than on the table structure, although certain advantages and conveniences result from the mounting of the ray source and the sensitive picturing means upon a common carriage structure, and by mounting the carriage means C, with the table structure, upon a common support base.

The sensitive picturing means 33 may comprise a fluorescent panel or layer 37 adapted to become visibly luminous in response to ray excitation, whereby to provide a visible shadow picture of the object B under examination. The sensitive picturing means alternatively may comprise ray sensitive sheet material, such as photographic film, adapted, upon exposure to penetrating rays from the source S, to receive a latent photographic image of the examination object B, such image being susceptible of subsequent chemical development to produce a visible shadow picture of the object in the photographic film.

The frame 31 may carry means substantially instantly operable to selectively present either the fluorescent screen 37 or a cassette enclosed sheet of ray sensitive material in position for picture making purposes at a picturing station in the frame 31, in vertical alinement with the beam of penetrating rays R. To this end, the support frame 31 may comprise a housing of generally elongated rectangular configuration and of hollow, box-like, preferably sheet metal construction embodying top and bottom walls 40 and 41, the top wall being formed with an opening 42, at the picturing station, in the forward end of the housing 31, means being provided for mounting the fluorescent panel 37 on the housing 31, in centered registration with respect to the opening 42.

The housing 31 may be mounted on the support members A in operative position with the geometrical center of the panel 37 in vertical registration with respect to the ray source S, regardless of the lateral and longitudinal adjustment of the carriage means C with respect to the table. As a consequence, by energizing the ray source S in any suitable preferred or conventional fashion, fluoroscopic examination of any portion of an object supported on the table may be accomplished merely by moving the carriage means C to dispose the ray source and the panel 37 in alinement with such portion of the examination object desired to be viewed on the panel 37.

The housing 31 may also contain mechanism for projecting and supporting cassette enclosed ray sensitive sheet material, such as photographic film, from a retracted position in the rear portions of the housing 31, into the picturing zone immediately beneath the fluorescent panel 37, in order to make ray pictures of the examination object on said film. Such mechanism may comprise suitable cassette carriage means adapted to receive and support a film carrying cassette therein. Such mechanism may also embody means for retracting and normally holding the cassette carriage means in retracted position opposite a preferably rectangular opening 43 formed in the rearward portions of the top wall 40 of the housing 31, behind the opening 42. Access to the interior of the housing may be had through said opening 43 to permit a cassette to be loaded into or removed from the cassette carriage means when in retracted position within the housing.

The carriage shifting mechanism may be driven by a motor 44, under the control of selectively operable mechanism 45, in order to project the cassette carriage means from retracted position, opposite the opening 43, into picturing position in the picturing zone beneath the fluorescent panel 37. The carriage projecting mechanism is preferably adapted to present the cassette in any selected one of a number of relatively shifted positions of cassette projection in the picturing zone, whereby desired portions only of the sensitive cassette enclosed material need be exposed for picture making purposes, as clearly explained in the aforesaid application for United States Letters Patent, Serial No. 343,094.

In order to correctly and precisely determine X-ray exposure intervals in exposing cassette enclosed sensitive material, in projected position at the picturing station in the frame 31, the present invention provides a ray-sensitive interval-timing unit 46 of relatively flat configuration and adapted to be incorporated in the frame 31, at the opening 42, immediately beneath the fluorescent panel 37 and between it and a carriage mounted film cassette in projected position at the picturing station, such unit being thus in position to detect and measure X-rays applied to and through the cassette and the sensitive material enclosed therein during an exposure interval.

To this end, the unit 46 may comprise means forming a preferably rectangular shallow housing 47 adapted to be mounted on the frame 31 in position extending within the opening 42. The housing may comprise edge walls, including spaced apart opposite end edge walls 48 and spaced apart opposite side edge walls 49, forming a peripheral frame 50. The peripheral frame may include integral inwardly extending top wall portions 51, on opposite sides of the frame, at and along the top edges of the opposite side edge walls 49, in position to form elongated chambers 52 immediately within the opposite side edge walls 49. The bottom of the peripheral frame 50 may be enclosed by a closure panel 53, secured at its edges upon the lower edges of the end edge walls 48 and upon inwardly turned flanges 54 formed on the lower edges of the side edge walls 49. A similar panel 53' may be provided for enclosing the housing between the top wall portions 51, such panel 53' being secured at its marginal edges to the upper edges of the end edge walls 48 and upon flange portions 54' formed on the wall portions 51 at the inwardly extending ends thereof.

The marginal edges of the panels 53 and 53' may be secured upon the peripheral frame 50 in any suitable or preferred fashion. As shown, the edges of the panels are preferably secured to the frame 50 by means of metal angle strips 55 and 55' secured upon the frame 50 as by means of spaced apart fastening screws 56' which penetrate the angle strips and take into the flanges 54 and 54' and the upper and lower edges of the end edge walls 48. Strips of felt or similar sealing material 57 are preferably secured between the angle strips 55 and 55' and the portions of the panels 53 and 53' and of the peripheral frame 50 covered by said strips, in order to seal the mounted edges of the panels 53 and 53' against light leakage into or from the housing 47.

The peripheral frame 50 may comprise metal or other suitably rigid self-supporting material. The closure panels 53 and 53' may comprise any suitable, convenient or preferred material that is opaque to visible light and relatively transparent to X-rays. The panels 53 and 53', accordingly, may comprise thin sheets of aluminum or other ray transparent material, or panels of plastic material, such as Bakelite, may be employed.

Disposed within the housing, between the spaced closure panels 53 and 53', is a sheet of X-ray sensitive fluorescent material 56, said sheet of material having opposite end portions 57 and 57' respectively underlying the closure panels 53 and 53', at the opposite sides of the unit, said portions 57 and 57' being clamped at their end edges respectively between the edges of the panels 53 and 53' and the panel supporting flanges 54 and 54'. The opposite end portions 57 and 57' of the sensitive sheet extend from the clamped ends thereof mutually inwardly to the opposite sides of an inclined sheet portion 59, said end portions 57 and 57' being integrally united with the inclined portion 59 along bend lines 58 and 58'.

In order to firmly support the sheet material 56 in the desired position shown, it may be sandwiched between supporting layers 60 and 60' of suitable preferably plastic material that is transparent to X-rays. These supporting layers preferably have uniform thickness and extend in position entirely overlying both of the opposite surfaces of the sheet 56 including the end portions 57 and 57' thereof as well as the medial inclined portion 59. The outwardly facing surfaces of the supporting layers, however, are made opaque to visible light rays throughout, except in a central light emitting area 59' thereof, as by coating the same with a layer of preferably white enamel pigment which is preferably highly light reflective. As a consequence, light generated in the sheet 56 as the result of X-ray impingement thereon may be emitted thence, within the housing 47, only at the central portions 59' of the sheet. The central portion 59' is disposed in the inclined section 59 of the sensitive sheet and is of rectangular marginal configuration. The projected area of the portion 59', in the direction of impinging rays, is a square equal in size to the smallest sectional area to which the ray beam R may be adjusted by operation of the shutter box S'.

It will be seen that the opposite surfaces of the light emitting portion 59' will face at an inclination toward the opposite side chambers 52. The portion 59' also will be disposed in the path of picturing rays emitted from the ray source S, immediately after the rays shall have traversed the cassette enclosed photographic material. The layer portion 59', accordingly, will be excited in accordance with the quality or intensity of exciting rays impinged thereon and accordingly will fluoresce and emit light at its opposite sides in quantity proportional to the quanta of rays impinging thereon.

In order to detect light, emitted in opposite directions by the sheet portion 59', light responsive detector means 61 are disposed in each of the housings 52, in vertical registration, transversely of the housing 47, with respect to the light emitting portion 59' of the ray sensitive sheet. Preferably the detector means 61 comprises a pair of phototube devices 62 and 62', each enclosed in a sleeve-like lead jacket 61' to protect the phototube against the action of such penetrating rays from the source S as may be directed toward the phototubes, the jackets 61' being provided with slots therein facing toward the light emitting portions 59' of the ray sensitive layer 56 to permit layer emitted light to reach the detector devices 62 and 62'. The light sensitive detectors 62 and 62' may be mounted one in each of the chambers 52, and supported therein on mounting brackets 63 secured, as by means of set screws 64, in the opposite end edge walls 49, the sensitive light detecting portions of the tube being disposed medially of the opposite ends of the chambers 52 and in vertical registration with and opposite the light emitting sheet portion 59'.

The phototube devices 62 and 62' preferably comprise multiplier type phototubes of the sort disclosed in Letters Patent of the United States No. 2,231,697 of February 11, 1941, covering the joint invention of Vladimir K. Zworykin and Richard L. Snyder, Jr., such tubes each having an anode 65, a light sensitive cathode 66, and a plurality of so-called dynode electrodes 67, including an end dynode 67'. The several operating elements of the phototubes 62 and 62' may be interconnected in parallel relationship in the manner indicated in Fig. 9. The so interconnected tubes may also be electrically connected in an external translation system 68, as through connection terminal means mounted on the housing 47, the system 68 being adapted to integrate the response of the phototubes in order to measure ray quanta applied to the zone 59' of the ray sensitive sheet, and also to actuate a load device such as a relay switch, whereby to control any operable equipment the operation of which is desired in accordance with the ray excitation of the sheet portion 59'.

To this end, the system 68 may comprise current integrating and relay actuating means of the sort shown in the aforesaid Letters Patent of the United States No. 2,401,289 or improved systems of the sort illustrated and described in copending applications for United States Letters Patent, covering the invention of Robert A. Arrison, Jr., in Means for and Method of Interval Timing, Serial No. 364,697, filed June 29, 1953, and the inventions of Robert Godbarsen, Jr., in Interval Timing Apparatus and Method, Serial No. 367,937, filed July 14, 1953, and in Switching System, Serial No. 367,947, filed July 14, 1953, now U. S. Patent No. 2,809,296.

As shown in Fig. 8, the X-ray tube forming the source S may be caused to operate for the generation of X-rays by energizing the cathode for electron emission, as by connecting its cathode conductors 69 with a suitable source of cathode energizing power, while simultaneously applying an electron driving potential between the cathode 12 and the anode 13 of the tube, as by connecting one of the cathode conductors 69 and an anode conductor 70 with a suitable source of electron driving power outwardly of the envelope of the X-ray tube. Electrons emitted by the cathode may travel thence as an electron beam under the influence of the anode-cathode electron driving potential, and may impinge upon the facing target surface of the anode 13, thereby constituting the same as an X-ray source from which X-rays may be emitted outwardly of the envelope 11 of the tube in the form of the ray beam R, under the control of the shutter box S' in a direction to traverse the body B, a cassette enclosed layer of picturing material, the sensitive light emitting zone 59' of the screen and the fluorescent panel 37.

To thus energize the X-ray tube, the anode conductor 70 and one of the cathode conductors 69 may be connected with the secondary winding 71 of a step-up transformer, either directly, for half wave self-rectified operation of the generator, or through suitable rectifying means 14, for generator operation with full wave rectified power as shown. The primary winding 72 of the step-up transformer may in turn be connected with the principal secondary winding 73 of a power transformer having an auxiliary secondary winding 73' and a primary winding 74 connected with a suitable power source 75, preferably through a disconnecting switch 76. Means, such as an adjustable connection 77 with the secondary winding 73, may be and preferably is provided for adjustably varying the potential applied between the anode and cathode of the X-ray tube. To energize the cathode of the tube for electron emission, the conductors 69 may be connected with the auxiliary secondary winding 73' of the power transformer, preferably through an adjustable connection 79.

In order to start and stop the emission of X-rays, a control switch 80 may be interposed at any convenient location in the anode-cathode power supply system, the switch 80, as shown, being preferably connected in the power supply circuit to the primary transformer winding 72. The switch 80 may comprise a normally open relay switch adapted to be and remain closed when and so long as an associated coil 81 is energized, as from the source 75. Accordingly, upon closure of the switch 80, the X-ray source S will be operated for the production of X-rays, the quanta value of which will be measured in terms of light generated in and emitted by the sensitive sheet portion 59' and applied thence upon the phototubes 62 and 62', the tubes 62 and 62' in turn being interconnected with the translation system 68, which comprises means for integrating the response of the detector tubes 62 and 62', to thereby measure total X-ray quanta delivered during an exposure interval being measured, and for actuating a load device 82 for the discontinuation of X-ray emission by the source S at the desired conclusion of the exposure interval.

To these ends the translation system 68 may embody a thyratron tube 83, the same comprising a gas filled electron flow device having a cathode 84, and anode 85, and a control grid 86. The cathode and anode 84 and 85 may be interconnected in an output circuit including a suitable power source 87 and the load device 82, which, in the illustrated embodiment, comprises a switch operating coil 88 and a normally closed relay switch 89 adapted to be opened when the coil 88 is energized. The control grid 86 of the thyratron may be connected in a control circuit in which the phototubes 62 and 62' are also operatively connected; and means is provided for electrically energizing the grid 86 for the control of the thyratron in accordance with total aggregate current caused to flow in both of the phototubes 62 and 62' during an X-ray exposure interval to be measured. The interconnected end dynode elements 67' of the phototubes, accordingly, may be interconnected with the grid of the thyratron tube through a conductor 90.

The grid control circuit may also include direct current power source means for applying electrical potential at suitable voltage values upon the anodes, the cathodes and dynodes of the phototubes. Adjustable resistance means 66' is also preferably interconnected in the cathode circuits of each tube as a sensitivity control whereby the action of the tubes may be accurately balanced. The control circuit may also include an integrating condenser 91 connected between the cathode and the grid of the thyratron 83, as well as a suitable source 92 of negative potential grid biasing power for the thyratron.

The thyratron 83 comprises a triggering device adapted to become conducting between its anode and cathode for the operation of the load device 82, from the power source 87, whenever the voltage applied between the grid and cathode of the thyratron reaches a predetermined value, such as, say, two volts of negative bias potential on the grid 86 with respect to the cathode 84. So long as the negative potential on the grid of the thyratron, with respect to the cathode, remains greater than two volts, the thyratron will remain in inactive non-conducting condition. The control circuit may also include a normally closed disabling switch 93, interconnected between the control grid 86 of the thyratron and the power source 92 in parallel with the integrating condenser 91, and a normally open anode circuit switch 97, connected between the anode 85 of the thyratron and ground in series with the power source 87 and the relay coil 88, the cathode of the thyratron being grounded, as shown, and hence connected with the grounded side of the power source 87. So long as the anode circuit switch 97 remains open, the thyratron 83 will remain inactive because its anode circuit will be open at the switch 97. Furthermore, while and as long as the disabling switch 93 is in closed position, a negative bias of potential substantially in excess of that at which the thyratron fires will be applied directly upon the grid 86, from the source of biasing potential 92. The condenser 91, of course, will remain inactive so long as the same is short circuited by the closed switch 93, the grid connected side of the condenser 91 being maintained at a potential with respect to the cathode 84 of the thyratron equal to the negative potential maintained on the grid 86 when the disabling switch 93 is closed.

Means is provided for opening the disabling switch 93 coincidentally with the closure of the switch 80 at the start of an exposure interval. When the switch 93 thus opens and switch 97 simultaneously closes, the thyratron will continue to be inactive because biased beyond cut-off. In this connection, the condenser 91 will have no charge in so far as the grid 86 of the thyratron is concerned, but its grid connected side will be at the negative potential with respect to said cathode 86 as supplied by the power source 92. As electrical current is delivered through the conductor 90 from the phototubes 62 and 62', as the result of X-ray excitation of the layer 56, the grid connected side of the condenser 91 will progressively lose negative electrons, thereby becoming positively charged in progressively increasing fashion. The opposite side of the condenser, of course, being connected with the power source 92, will be held at a voltage level determined by said source. After an interval determined by the amount of such condenser charging current flow, the capacity of the condenser 91, and the value of bias voltage supplied by the source 92, the difference of negative potential between the control grid 86 and cathode 84 of the thyratron will decrease to the bias voltage level at which the thyratron may fire. When the thyratron is thus fired or placed in operation, it will energize the relay coil 88 and cause the switch 89 to open. After being triggered, the thyratron 83 will continue in operation until the switch 97 is reclosed and the switch 93 reopened.

Any preferred means may, of course, be employed for utilizing the foregoing operation of the thyratron. As shown in Fig. 8, however, such control may be accomplished by providing a relay 94 having an actuating coil 95, a normally open switch 96, the normally open switch 97, and the normally closed switch 93. The coil 95 may be connected with the power source 75, in series with, and hence under the control of a normally open control switch 98, preferably of the manually operable, push button type. The normally open switch 96 may also be connected in series with the normally closed relay switch 89 and the operating coil 81 of the normally open switch 80, to form a series circuit connected with the power source 75. The normally open switch 97 may be interconnected in the plate circuit of the thyratron, in series with the power source 87 and the operating coil 88 of the load device 82.

The X-ray source S thus may be placed in operation for the emission of the ray beam R and for the application thereof to the body B, the cassette enclosed sensitive picturing material, and the sensitive sheet 56, by manual closure of the switch 98. Closure of the switch 98 energizes the relay coil 95 to open the switch 93 and close the switches 96 and 97. Closure of the switch 96 will complete a relay energizing circuit through the switch 89 and the operating coil 81 to thereby cause closure of the normally open ray source controlling switch 80, to thereby start the X-ray generator S in operation for the emission of X-rays. Thereafter the ray source will remain in emitting condition until a predetermined exposure, measured in terms of ray quanta, shall have been applied to the body B. Thereupon the thyratron tube 83 will be caused to fire as the result of the integrating action of the condenser 91. When the thyratron is thus activated, it will complete an operating circuit through the switch 97, which at such time is in closed condition, in order to energize the coil 88 and thus open the energizing circuit of the coil 81 at the switch 89. When the coil 81 is thus deenergized, its associated relay switch 80 will open, thereby disabling the X-ray source and causing X-ray emission therefrom to cease for the termination of the exposure interval.

The sensitive screen 56, for use in timing exposure intervals of the order of more than 0.1 second duration may comprise any suitable ray responsive fluorescent material such as zinc sulfide. Ordinary fluorescent materials, however, have fluorescent image decay time constant characteristics causing image persistence in the sensitive material after the extinction of exciting rays, such image persistence being of sufficient duration in ordinary fluorescent materials, to result in erroneous operation of the integrating system where the interval being measured is short.

As shown more particularly in Fig. 10, where full wave rectified power is employed for the operation of the generator, the anode-cathode generator actuating potential comprises a succession of voltage pulses at a frequency that is double that of the alternating current power delivered through the transformer winding 71, such pulses forming a voltage wave 101. Where an X-ray generator is operated as a self-rectifying unit, alternating potential is applied directly between the anode and cathode of the device. Since ray producing electrons may flow only from cathode to anode, it will be seen that rays may be produced at the anode of the generator only during the positive half cycle periods of generator energizing power. Such positive half cycle anode-cathode voltage pulsations occur at a frequency equal to that of the alternating current power applied to the generator for the actuation thereof. The ray producing positive half cycle pulsations of anode-cathode voltage applied to the generator when operated as a self-rectified unit thus comprise a wave 101' of the sort depicted in Fig. 11.

Electron flow between the anode and cathode of an X-ray generator, at energy levels capable of producing X-rays, does not take place to any appreciable extent except during intervals when anode-cathode voltage of positive electron driving character is applied at a potential in excess of a definite value, such as the potential level indicated at 102 in Figs. 10 and 11, X-ray production, during the intervals when anode-cathode voltage is in excess of the voltage level 102, being proportional to the excess voltage prevailing during such periods, as shown by the curves 103 and 103', in Figs. 10 and 11. The curves 103 and 103' respectively illustrate X-ray production in response to full and half wave operation of the generator.

When the phototubes 62 and 62' are excited in response to rays of the sort shown by the curves 103 and 103', the current output therefrom desirably should comprise a pulsating current wave of the sort shown by 104 or 104' respectively corresponding precisely with the ray pulsations 103 and 103'. Due to the image persisting characteristics of photo-sensitive material, ray excitation thereof and consequent light production and emission therefrom may result in application of light upon the detector tubes 62 and 62' during the intervals between successive ray pulses or during portions of said intervals, as indicated by the dotted line curves 105 and 105', in association with the graphical curves 104 and 104'. The areas 106 and 106' defined between the dotted lines 105 and 105' and the curves 104 and 104' represent the amount of light emitted by photo-sensitive material having slow decay time characteristics during periods after extinction of the exciting rays. The relatively slow decay time constant of ordinary photo-sensitive materials thus will result in the flow of more current from the phototubes to the integrating condenser than would occur if light emission from the photo-sensitive material were to be precisely responsive to X-ray incidence thereon. As a consequence the condenser tends to become charged faster than it should. The thyratron is actuated to terminate the exposure before a desired quanta of rays has been emitted.

Where the interval being measured comprises a period of sufficient length to include therein several successive cycles of generator actuating power, the integrating errors, caused by a slow decay time constant characteristic of the sensitive sheet material 56, can be compensated for by adjusting the bias supplied on the thyratron from the power source 92, since the error, when measured over several cycles of generator energizing power tends to become directly proportional to the length of the measured interval.

Where, however, the exposure interval is of duration of less than 0.1 second, equivalent to twelve cyclic pulses of X-rays produced by a tube energized by full wave rectified sixty cycle alternating current power, or to six ray pulses where the tube is in operation as a self-rectified unit, the error introduced by slow image decay characteristics of the sensitive sheet material 56 becomes increasingly greater as the exposure time interval diminishes, such error increase being somewhat erratic and to some extent dependent upon the relative position of the terminal instant of the exposure interval in or with respect to the ray source energizing power cycle. Accordingly, where the sensitive screen unit is to be used in conjunction with equipment for measuring exposure intervals of duration less than 0.1 second, and particularly for ultra short exposure of the order of one-thirtieth second, or less, the sensitive sheet material 56 should comprise ray sensitive fluorescent material, such as calcium tungstate, having highest possible image decay speed time constant characteristics, that is to say, material in which ray induced luminosity fades substantially instantly, as during an interval of the order of one-thousandth of a second, after the termination of irradiation thereon. The graphical curves 104 and 104' show the response of the layer 56 in terms of photo tube current, when the layer 56 comprises material such as calcium tungstate having rapid image decay characteristics.

It should, of course, be understood that the screen 37 normally would not be used for fluoroscopic examination purposes during the interval while a radiographic exposure is being made. Fluoroscopic examination is made, usually, at other X-ray intensities than are required for photographic purposes. Accordingly, a selector switch may be provided for placing the apparatus in condition either for fluoroscopy or for radiography; and a suitable manual switch 100 may be provided for operating the ray generator for fluoroscopic purposes. The layer 56, of course, remains in situ beneath the screen 37, at all times, and consequently will be energized by rays from the source S during fluoroscopy, and could be employed to operate any desired equipment during fluoroscopic examination of the object B.

It will be seen from the foregoing that the sensitive screen 56, when excited by ray impact thereon, will emit light from the zone 59', in both directions, thereby affording maximum response in terms of total emitted light per unit quanta of impinging rays to be measured. The screen 56 and its plastic support layers 60 and 60' also have low ray absorption characteristics in order not excessively to rob the fluorescent screen 37 of exciting ray energy, it being desirable in the interests of fluoroscopic examination of the body B by means of the panel 37 to keep the image intensity at the fluoroscopic screen 37 as close to its maximum value as possible. This is accomplished by utilizing light emission from both of the opposite sides of the sensitive layer 56, thereby making possible use of a layer having very low ray absorbing characteristics. In this connection, devices embodying the present invention may extract energy from the ray beam into the sensitive layer 56 sufficient to reduce the image intensity in the fluoroscopic layer 37 by an amount of the order of ten percent. Such loss, however, is negligible, since it may be entirely overcome by increasing the intensity of the ray beam R by an amount of the order of two percent.

Since the detector information is received upon the phototubes 62 and 62' from a screen area of constant size which encompasses the smallest sectional area of the ray beam normally shuttered by the box S', the detector is not affected by variations in the adjustment of the shutter box producing ray beam sectional areas in excess of that of the active zone 59' of the sensitive sheet. Since the detector tubes are housed in a light tight chamber, the phototiming apparatus is unaffected by light conditions in the location where the equipment is installed for operation. Furthermore, the phototubes 62 and 62' are protected from possible damage due to overloading caused by accidental exposure to artificial or natural light conditions which may exist at the work station where the equipment is operated. The light tight housing 47 also eliminates timing errors which may be introduced by the usually red lamps commonly employed in rooms or cabinets in which fluoroscopy is practiced. The sealed character of the housing 47 likewise protects against timing errors occasioned by the accumulation of dust, dirt, smear marks or other external physical impedimenta in the light path between the sensitive screen and the phototubes.

Where the apparatus of the present invention is employed, the conventional focal spot to body to film distances may remain unchanged. The distance from the body B to the fluoroscopic screen 47, however, will be increased by approximately the depth of the housing 47, the same being of the order of one inch. This increase, as a consequence, will result in slight magnification, of the order of three percent, in the size of the fluoroscopic image, such magnification, for all practical purposes, being negligible.

In order that as much as possible of the light emitted by the opposed faces of the light emitting zone 59' may reach the photosensitive detectors 62 and 62', the inner surfaces of the housing members 50, 53 and 53' and the surfaces of the sheet member 56, except the portions thereof at the zone 59', may be coated with white enamel paint or otherwise rendered highly light reflecting.

The arrangement of the screen member for the emission of light in divergent directions from the scanning zone 59 provides substantially ideal integration of the response of the scanning area to ray impingement thereon. Substantially ideal response integration is obtained by employing an inclined double faced light emitting screen in combination with detector tubes disposed on opposite sides of and substantially equally spaced from the light emitting portions of the screen. Ray detecting devices embodying the present invention are substantially insensitive to eccentric distribution of light and dark image patches within the scanning area 59'. If, for instance, with balanced phototube outputs accomplished by adjustment of the resistors 66', a main center of relative darkness should occur in the light emitting zone 59', in the area thereof nearest one of the phototubes, the remaining portions of the zone emitting light relatively more actively, the output of the other phototube will be substantially greater than that of the phototube that is nearest to the center of relative darkness. Such circumstance, of course, is due to the difference in the distance of the phototubes from the active light emitting portions of the zone 59'. The combined output of both detectors, however, will remain unchanged regardless of the location of the center of darkness. That this balanced result is inherent in the detector unit will be apparent from an analysis of the geometry of the light emitting portions of the screen and the spacement of the detector tubes therefrom. As a consequence of the arrangement herein illustrated, the device accurately averages, that is to say integrates, light emitted in all areas of the emission zone 59' regardless of eccentric random distribution of localized light or dark patches within the zone.

It is thought that the invention and its numerous attendant advantages will be fully understood from the foregoing description, and it is obvious that numerous changes may be made in the form, construction and arrangement of the several parts of the ray sensitive screen unit and associated apparatus without departing from the spirit or scope of the invention, or sacrificing any of its attendant advantages, the form herein disclosed being a preferred embodiment for the purpose of demonstrating the invention.

The invention is hereby claimed as follows:

1. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, and a pair of photosensitive detectors spaced apart on opposite sides of the path of said rays in position each to be influenced by light emitted from a corresponding face of said layer.

2. Ray detecting means comprising a layer of ray sensitive material having uniform ray absorbing characteristics throughout the area thereof and adapted to emit light when exposed to rays to be detected, said layer having spaced apart portions, extending in a direction to intercept the rays, and intermediate light emitting portions interconnecting and extending at an inclination with respect to said spaced portions, and light sensitive detector means disposed outwardly of said inclined portions in position to be excited by light emitted thereby.

3. Ray detecting means comprising a layer of ray sensitive material having uniform ray absorbing characteristics throughout the area thereof and adapted to emit light at each of the opposed faces thereof, said layer having spaced apart portions extending in relatively offset planes and an intermediate portion interconnecting said spaced portions and extending at an inclination with respect to said planes, light opaque material overlying the opposite surfaces of said layer except at light emission zones on opposite sides of said intermediate portion, and light sensitive detectors disposed on opposite sides of said inclined portion in position to be excited by light emitted at said zones.

4. Ray detecting means comprising a layer of ray sensitive material having uniform ray absorbing characteristics throughout the area thereof and adapted to emit light at each of the opposed faces thereof, said layer having spaced apart portions extending in relatively offset planes and an intermediate portion interconnecting said spaced portions and extending at an inclination with respect to said planes, a light opaque material overlying the opposite surfaces of said layer except at light emission zones on opposite sides of said intermediate portion, and light sensitive detectors disposed on opposite sides of said inclined portion in position to be excited by light emitted at said zones, said zones being of elongated configuration, in the direction of inclination of the intermediate portion, said zones having configuration such that the projection thereof, in the direction of said detectors, is substantially square.

5. Ray detecting means comprising a shallow housing having opposed faces and peripheral walls enclosing the housing between said faces, a layer of ray sensitive material having uniform ray absorbing characteristics throughout the area thereof and adapted to emit light at each of the opposed faces thereof, said layer having spaced apart portions extending in relatively offset planes, substantially at said opposed faces of the housing, and an intermediate portion interconnecting said spaced portions and extending at an inclination with respect to said planes, and light sensitive detectors disposed on opposite sides of said inclined portion in position to be excited by light emitted by said inclined portion.

6. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, a pair of photosensitive detectors spaced apart on opposite sides of the path of said rays in position each to be influenced by light emitted from a corresponding face of said layer, and an operable device controllingly connected with said photosensitive detectors for operation in response to the excitation of said detectors by layer-emitted light.

7. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, a pair of photosensitive detectors spaced apart on opposite sides of the path of said rays in position each to be influenced by light emitted from a corresponding face of said layer, and a gaseous conduction electron flow valve having a control grid connected with said detectors whereby to operate said valve in accordance with the excitation of said detectors by layer-emitted light.

8. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, a pair of photosensitive detectors spaced apart on opposite sides of the path of said rays in position each to be influenced by light emitted from a corresponding face of said layer, a gaseous conduction electron flow valve having a control grid, and a condenser connected with said control grid and with said detectors to operate said valve in accordance with the excitation of said detectors by layer-emitted light.

9. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, a pair of photosensitive detectors spaced apart on opposite sides of the path of said rays in position each to be influenced by light emitted from a corresponding face of said layer, and a fluoroscopic ray sensitive screen mounted at the source remote side of said layer, whereby rays in reaching the screen are necessarily required to pass through said layer.

10. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, a pair of photosensitive detectors spaced apart on opposite sides of the path of said rays in position each to be influenced by light emitted from a corresponding face of said layer, control means selectively operable to apply and to prevent application of rays through an exposure object and upon said layer, means for operating said control means to cause ray application upon said exposure object at the start of an exposure interval, and means, operable in response to the excitation of said detectors, to actuate said control means for the discontinuation of ray application on said exposure object at the conclusion of an exposure interval.

11. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, a pair of photosensitive detectors spaced apart on opposite sides of the path of said rays in position each to be influenced by light emitted from a corresponding face of said layer, control means selectively operable to apply and to prevent application of rays through an exposure object and upon said layer, means for operating said control means to cause ray application upon said exposure object at the start of an exposure interval, and a normally inactive gaseous conduction electron flow valve controllingly connected with said detectors and adapted to be activated thereby to operate said control means for the discontinuation of ray application on said exposure object at the conclusion of an exposure interval.

12. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, a pair of photosensitive detectors spaced apart on opposite sides of the path of said rays in position each to be influenced by light emitted from a corresponding face of said layer, control means selectively operable to apply and to prevent application of rays through an exposure object and upon said layer, means for operating said control means to cause ray application upon said exposure object at the start of an exposure interval, a normally inactive gaseous conduction electron flow valve having a control grid, and a condenser connected with said grid and with said detectors to be progressively charged, in response to ray induced light excitation of said detectors, whereby to activate said valve to operate said control means for the discontinuation of ray application on said exposure object at the conclusion of an exposure interval.

13. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, and a pair of photosensitive detectors spaced apart on opposite sides of the path of said rays in position each to be influenced by light emitted from a corresponding face of said layer, said layer of ray sensitive material comprising calcium tungstate having substantially instantaneous light image decay characteristics, whereby the excitation of said detector means may correspond substantially precisely with the wave form of rays incident upon said layer.

14. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, a pair of photosensitive detectors spaced apart on opposite sides of the path of said rays in position each to be influenced by light emitted from a corresponding face of said layer, and a gaseous conduction electron flow valve having a control grid connected with said detectors whereby to operate said valve in accordance with the excitation of said detectors by layer-emitted light, said layer of ray sensitive material comprising calcium tungstate having substantially instantaneous light image decay characteristics, whereby the excitation of said detector means may correspond substantially precisely with the wave form of rays incident upon said layer.

15. Ray detecting means comprising a layer of ray sensitive material adapted to emit light when exposed to the action of rays to be detected, means to dispose said layer in the path of rays to be detected at an inclination with respect to the path of said rays whereby to provide inclined light emitting surfaces in said layer and facing in opposite directions laterally outwardly of the path of said rays, a pair of photosensitive detectors spaced apart on opposite sides of the path of said rays in position each to be influenced by light emitted from a corresponding face of said layer, control means selectively operable to apply and to prevent application of rays through an exposure object and upon said layer, means for operating said control means to cause ray application upon said exposure object at the start of an exposure interval, and means, operable in response to the excitation of said detectors, to actuate said control means for the discontinuation of ray application on said exposure object at the conclusion of an exposure interval, said layer of ray sensitive material comprising calcium tungstate having substantially instantaneous light image decay characteristics, whereby the excitation of said detector means may correspond substantially precisely with the wave form of rays incident upon said layer.

References Cited in the file of this patent

UNITED STATES PATENTS

| | | |
|---|---|---|
| 2,086,718 | Knoll | July 13, 1937 |
| 2,403,227 | Leverenz | July 2, 1946 |
| 2,416,595 | Reynolds | Feb. 25, 1947 |
| 2,546,734 | Farber | Mar. 27, 1951 |
| 2,552,858 | Mueller et al. | May 15, 1951 |
| 2,583,132 | Altar et al. | Jan. 22, 1952 |
| 2,666,145 | Eversole et al. | Jan. 12, 1954 |
| 2,681,417 | Ball | June 15, 1954 |
| 2,709,221 | Haupt et al. | May 24, 1955 |
| 2,711,482 | Goodman | June 21, 1955 |